United States Patent
Wanat

Patent Number: 5,310,259
Date of Patent: May 10, 1994

[54] MIXER WITH LOCKOUT DEVICE FOR POWER BOOST SWITCH

[75] Inventor: David J. Wanat, Meriden, Conn.

[73] Assignee: Black & Decker Inc., Newark, Del.

[21] Appl. No.: 12,207

[22] Filed: Feb. 2, 1993

[51] Int. Cl.$^5$ ............................................... B01F 7/00
[52] U.S. Cl. ................................. 366/349; 200/43.16; 366/601
[58] Field of Search .............. 366/129, 601, 348, 349, 366/297, 300, 197, 206, 222, 224; 200/43.16, 327, 318

[56] References Cited

U.S. PATENT DOCUMENTS

| | | | |
|---|---|---|---|
| 3,328,001 | 6/1967 | Zasadny | 366/601 |
| 3,341,181 | 9/1967 | Chambers | 366/129 |
| 3,619,754 | 11/1971 | Fuchs | 366/129 |

Primary Examiner—Robert W. Jenkins
Attorney, Agent, or Firm—Barry E. Deutsch

[57] ABSTRACT

A mixer includes a primary operating switch for connecting the mixer to a source of electrical energy and a secondary operating switch for selectively increasing the power of the mixer. The primary operating switch is movable between a first position whereat the mixer is disconnected from the source of electrical energy and a second position whereat the mixer is connected to the source of electrical energy. The primary operating switch includes a stop. The secondary switch is movable between a first position whereat the mixer is operating at normal power and a second position whereat the mixer is operating at increased power. The stop of the primary switch is disposed in the path of travel of the secondary switch when the primary switch is in its first operating position to prevent the secondary switch from being placed into the second position thereof. The stop is displaced from the path of travel of the secondary switch when the primary switch is placed into its second operating position.

4 Claims, 1 Drawing Sheet

5,310,259

MIXER WITH LOCKOUT DEVICE FOR POWER BOOST SWITCH

BACKGROUND OF THE INVENTION

This invention relates to electrically operated mixers and, in particular, to such mixers having a power boost circuit which can be electrically energized to increase the power of the mixer.

Hand-held electrically operated mixers are one of the primary devices used by persons in cooking and baking foods. Some high performance mixers have power boost circuitry to selectively increase the torsional power of the mixer when the user is mixing particularly heavy food products. Generally speaking, the mixers of the foregoing type have a primary operating switch which is used to connect the mixer to a source of electrical energy and to change the speed of the mixer as desired by the user. The mixer will also include a secondary switch for selectively increasing the torsional power of the mixer.

Since both the primary and secondary switches connect various electrical circuitry of the mixer to the source of electrical power, it is desirable that the secondary switch not be independently capable of electrically actuating the mixer. That is to say, the primary switch should be the sole means for initially energizing the mixer while the secondary switch should only be actuated when the primary switch has already connected the mixer to the source of electrical power.

Accordingly, it is an object of this invention to prevent the secondary switch from connecting the mixer to a source of electrical energy in the absence of the primary switch being initially placed into an operating position for connecting the mixer to the source of electrical energy.

SUMMARY OF THE INVENTION

The foregoing object and other objects of the invention are obtained in a mixer having a primary operating switch for connecting the mixer to a source of electrical energy and a secondary operating switch for selectively increasing the power of the mixer. The primary operating switch is movable between a first position whereat the mixer is disconnected from the source of electrical energy and a second position whereat the mixer is connected to the source of electrical energy. The primary operating switch includes stop means. The secondary switch is movable between a first position for operating the mixer at normal power and a second position for operating the mixer at maximum power. The stop means of the primary switch is in the path of travel of the secondary switch when the primary switch is in the first operating position to prevent the secondary switch from being placed into said second position thereof. The stop means is displaced from the path of travel of the secondary switch when the primary switch is placed into said second position.

DESCRIPTION OF THE PREFERRED EMBODIMENT

Figure 1:
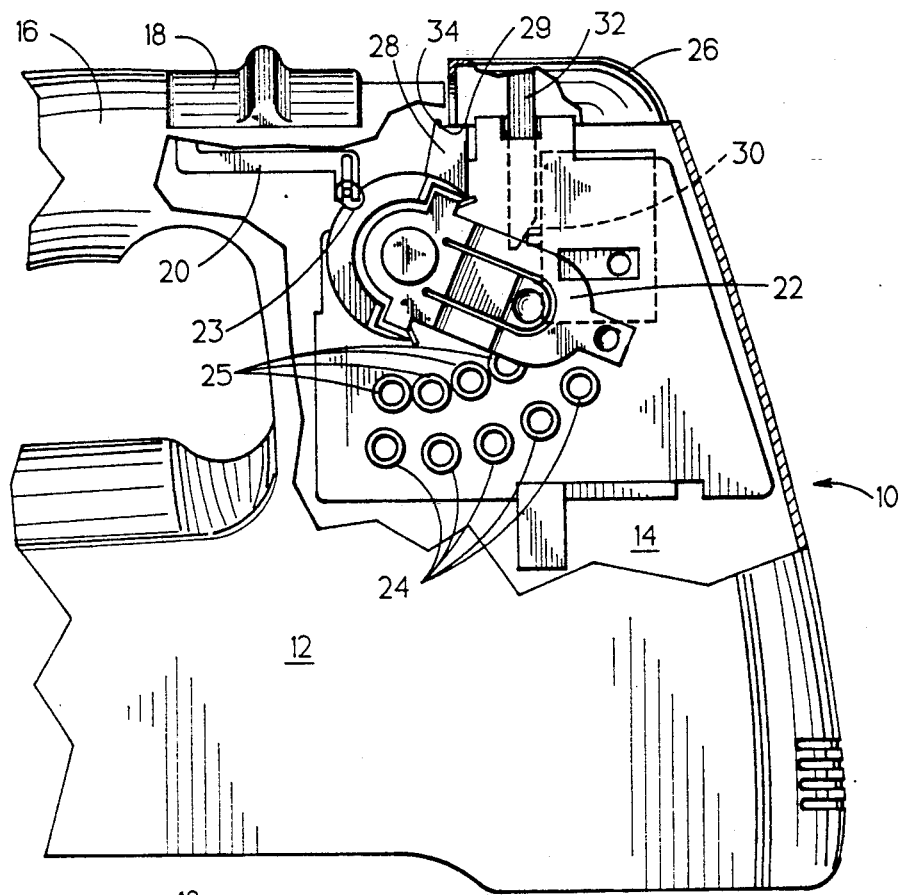
FIG. 1 is an elevational, partially sectional view, of a portion of a mixer illustrating the present invention in a first operating state.
Figure 2:
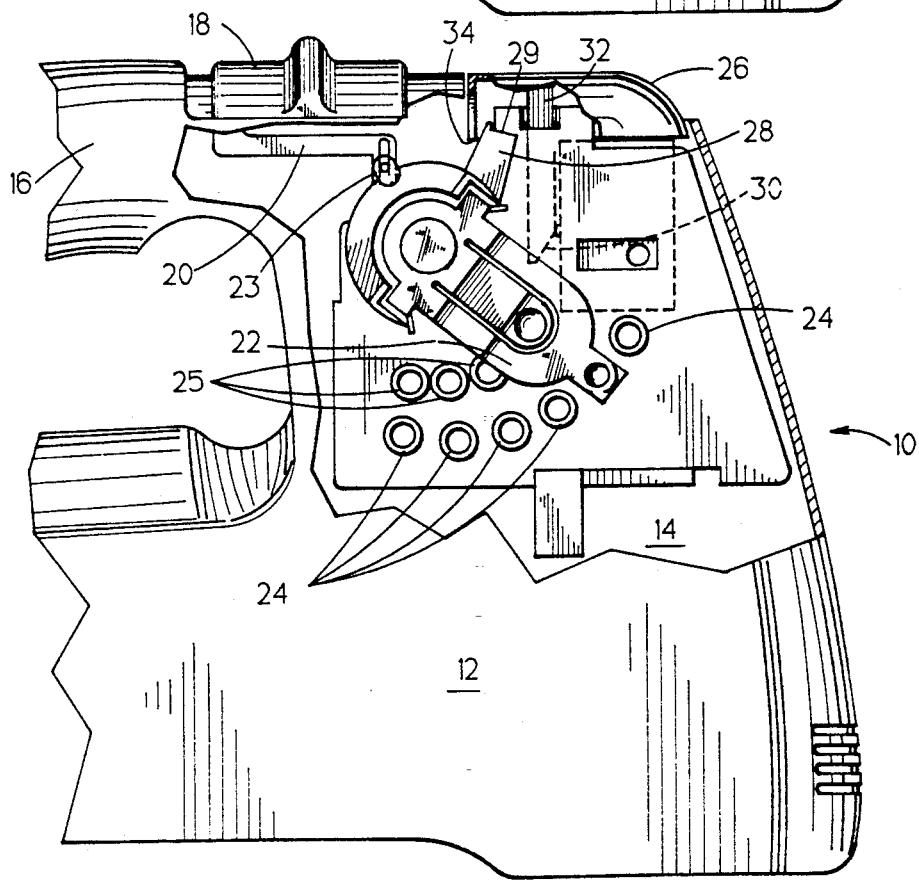
FIG. 2 is a view similar to FIG. 1 illustrating the present invention in a second operating state.

FIGS. 1 and 2 illustrate a portion of a hand-held mixer 10. The illustrated portion is the front end of the mixer and is of a type well known to those skilled in the art. Mixer 10 includes a housing 12 generally formed from suitable thermoplastic material such as polycarbonate or the like. Housing 12 includes a space 14 in which operating components of the mixer are located, such as the motor, switches, and other such elements, all of which are standard within common mixers.

Mixer 10 includes a handle 16 for grasping by the user. A switch 18 is mounted in the top or upper face of housing 12 for movement relative to the handle. Switch 18 controls the rotational speed of the mixer via switch 22.

Switch 18 is connected to switch 22 via operating arm 20. Arm 20 translates the linear movement of switch 18 into rotational movement of switch 22 as it is connected to switch 22 at pivot point 23. Switch 22 selectively connects one of the pairs of conductors 24, 25 to the electrical circuitry (not shown) controlling the speed of the mixer's motor.

Switch 22 has a generally upstanding rib 28 integrally formed therewith. Mixer 10 includes a second switch 26 also disposed in the top or upper face of housing 12. Switch 26 is connected to an operating arm 32. Operating arm 32 is movable in a vertical plane within space 14 of housing 12 in response to the user depressing switch 26. FIG. 1 illustrates switch 26 in an undepressed or "off" position whereas FIG. 2 illustrates switch 26 in a depressed or "on" position.

When switch 26 moves operating arm 32 downwardly, it contacts a microswitch 30 as illustrated in FIG. 2. Microswitch 30, in turn, is connected in the electrical circuitry for the motor. As is conventional, the closure of switch 30 results in bypass of all resistive speed controlling windings and the torque feedback circuitry, allowing maximum torque available in the motor irrespective of the actual speed selected via actuation of switches 18 and 22.

As illustrated in FIG. 1, switch 18 is in its off position so that the motor of the mixer is deenergized. When switch 18 is off, it is desirable that switch 26 be prevented from being depressed downwardly to engage microswitch 30. If switch 26 is depressed downwardly even though switch 18 is in its off position, power could inadvertently be delivered to the motor via switches 26 and 30.

As illustrated in FIG. 1, the bottom surface 34 of switch 26 engages the top surface 29 of rib 28 when switch 22 is in its off position. This interlock between switches 26 and 22 prevents switch 26 from being depressed when switches 18 and 22 are in their off positions as illustrated in FIG. 1.

As illustrated in FIG. 2, switch 18 has been moved so that it is in an on position whereat the user has selected a desired speed. The movement of switch 18 in turn cause switch 22 to rotate to selectively connect one of the pairs of contacts 24, 25 to achieve the desired speed. The movement of switch 22 in a clockwise direction results in rib 28 being moved beyond the point of contact with switch 26 which thereby enables the switch to be depressed. In the position illustrated in FIG. 2, rib 28 is displaced from the vertical path of movement of switch 26 which allows the switch to be depressed. As illustrated in FIG. 2, depression of switch 26 results in operating arm 32 closing microswitch 30 to provide maximum torsional power for the motor within the electrical circuitry of the mixer.

By providing an interlock between switches 26 and 22, inadvertent actuation of switch 26 is prevented thereby preventing electrical power from being connected to the motor of the mixer when not intended.

While a preferred embodiment of the present invention has been described and illustrated, the invention should not be limited thereto but may be otherwise embodied within the scope of the following claims.

What is claimed is:

1. A mixer having a primary operating switch for connecting the mixer to a source of electrical energy and a secondary operating switch for selectively increasing the power of the mixer, said primary operating switch being movable between a first position whereat the mixer is disconnected from the source of electrical energy and a second position whereat the mixer is connected to the source of electrical energy, the primary operating switch including stop means, said secondary switch being movable between a first position whereat the mixer is operating at normal power and a second position whereat the mixer is operating at increased power, said stop means of said primary switch being disposed in the path of travel of said secondary switch when the primary switch is in said first position to prevent said secondary switch from being placed into said second position thereof, said stop means being displaced from said path of travel of said secondary switch when the primary switch is placed into its second position.

2. A mixer according to claim 1 wherein said stop means in integrally formed with said primary switch.

3. A mixer according to claim 2 wherein said stop means comprises a radially extending shoulder and said secondary switch includes a radially extending surface, with said shoulder engaging said surface when the primary and secondary switches are both in their first operating positions.

4. A mixer according to claim 1 wherein said stop means comprises a radially extending shoulder extending surface, with said shoulder engaging said surface when the primary and secondary switches are both in their first operating positions.

* * * * *